Patented Aug. 5, 1952

2,606,132

UNITED STATES PATENT OFFICE 2,606,132

COPPER BRAZING COMPOSITIONS

Louis G. Klinker, Griffith, Ind., assignor to The Glidden Company, Cleveland, Ohio, a corporation of Ohio No Drawing. Application April 15, 1950, Serial No. 156,236

17 Claims. (Cl. 148—24)

This invention relates to copper brazing compositions especially adapted for use in furnace brazing operations and in other copper brazing and soldering operations, to supply the metallic material which unites the parts to be joined.

Furnace brazing is an art which has now been practiced for well over a decade, the term "furnace brazing" being understood to refer to a furnace process in which an assembly of close-fitting parts (usually of ferrous metal) is heated in a reducing atmosphere to temperatures slightly above the melting point of copper. Metallic copper is positioned in or around the joints to be brazed, such positioning being done before the assembly is put in the furnace. When the assembly reaches and slightly surpasses the melting point of copper, the pre-positioned metallic copper melts and is drawn by capillary attraction into the close-fitting joint, thereby making a strong, sound brazed joint. In the past, the pre-positioned metallic copper has been provided on the assembly in the form of wire shapes conforming to the shape of the joint to be brazed, or as copper slugs or shot inserted in a cavity adjacent the joint, or as copper foil shapes, or as pastes of copper powder in a vehicle such as pyroxylin, ordinary machine oil, glycerin, alcohol, water, etc.

Pastes have many advantages over the wrought and formed sources of copper (foil, wire, slugs, shot, etc.) since pastes can be applied to a joint of any shape in any desired quantity, are cheaper than preformed shapes, are easier to apply, eliminate large inventories of preformed copper shapes by permitting the stocking of just one source of copper in place of the numerous shapes, sizes, weights, and types otherwise needed for various assemblies. Despite such advantages, pastes have not been found in the past to be satisfactory. In my copending applications Serial Nos. 107,139 now Patent No. 2,594,313 and 107,140, filed July 27, 1949, the latter now U. S. Patent No. 2,566,339, I have described improved pastes which offer more complete utilization of the foregoing advantages. The present application is a continuation-in-part of these two copending applications. I have now found that further advantages can be imparted to copper brazing pastes by incorporating ferruginous materials therein in relatively small amounts. The ferruginous materials are adapted to supply finely-divided metallic iron when the paste is subjected to copper brazing furnace temperatures and atmospheres, and such finely-divided iron is instrumental in altering the fluidity or "running" tendencies of the molten copper so as to avoid or minimize the tendency of the molten brazing metal to flow out of or away from the intended joint, while yet not impairing the formation of sound joints by capillarity. Other advantages are also due to the presence of the metal iron, and are described more fully hereinafter.

Accordingly, it is the principal object of this invention to provide improved copper-iron brazing compositions in the form of pastes.

It is a further object to provide improved copper brazing pastes containing small amounts of ferruginous materials.

Another object is to provide improved copper-brazed joints characterized by the presence therein of undissolved iron particles dispersed through the brazing metal.

These and other objects will be apparent from the following description of the invention.

I have found that various advantages attend the use of a furnace brazing composition which at copper brazing temperatures and in copper-brazing atmospheres provides a metallic brazing material composed of copper and very finely-divided iron, the iron amounting to between about 0.5% and 12%, and being in the form of particles smaller than about 5 microns diameter. Such a brazing material produces stronger joints, reduces or avoids waste due to "running" from the joint, permits strong joints to be made even when poor or loose fits are encountered, permits the salvage of assemblies which could not heretofore be brazed satisfactorily, and reduces the amount of brazing metal required per joint.

In the past, when using pure or commercial copper as the brazing metal, it has been customary to proportion the amount of copper as closely as possible to the requirement of each particular joint. In order to secure maximum strength in a brazed joint, it is necessary that there be at least enough copper available to completely fill the joint. The use of more copper than is so required ensures the presence of the required amount, and this expedient has been customary in the past. However, the excess copper has a tendency to run from the joint to any lower adjacent part of the assembly, and this tendency frequently results in having brazed assemblies which carry brazing copper in undesired locations. For example, in brazing wire screens the copper tends to "blind" some of the screen openings disposed in the vicinity of the brazed joint. Frequently the excess copper may "run" on brazed machine parts to areas on which it cannot be tolerated, as for example, to an area which is to be carburized subsequently, and in such instances the copper must be ground off or otherwise removed; otherwise the brazed assembly must be scrapped. In other instances a completely filled joint is desired, and a fillet around the joint is also desired. When enough extra copper is added to form the fillet, there is the attendant risk of its "running" to some other portion of the assembly. Accordingly, it will be understood that the tendency of the molten copper to run from the joint creates numerous operating difficulties.

Occasionally the parts of an intended assembly do not have dimensions which provide the close fit normally sought in joints intended to be furnace brazed. If the fit is too poor, the assembly cannot be successfully brazed, either because the copper is not drawn by capillarity into the joint, or because the copper runs through the joint and out the bottom. Frequently such poorly-fitting parts must be scrapped.

Sometimes the poor fit is not discovered until after the assembly has passed through the brazing furnace. Then the assembly may carry most of the brazing copper in an area away from the joint. If more copper is added and the assembly is re-brazed, the situation is merely aggravated.

I have found that difficulties of the types just outlined can be largely avoided when small amounts of finely-divided iron are disposed in the vicinity of the intended brazed joint at least by the time the melting point of the copper is reached, so as to become dispersed in the copper when the latter becomes molten. The presence of the finely-divided iron in sufficient amounts at this critical time alters or even avoids the "running" tendency of the molten copper. Perhaps the explanation of this observation is that the iron mechanically impedes the flowing copper; or that by supplying additional iron-copper interfaces it decreases the apparent fluidity of the copper, or perhaps both effects occur simultaneously with others. Whatever the explanation may be, I have found that as the amount of finely-divided iron is increased in proportion to the copper, the less is the observed flowing or "running" tendency of the molten copper. When about 12% of iron is present with 88% of copper, the resulting brazing metal is substantially non-fluid, or at least on the finished assembly evidences no tendency of having flowed away from its applied position. As the amount of iron is decreased, the "running" tendency of the copper is impeded less. At least about .5% of iron (balance copper) is needed to show any noticeable reduction in the "running" tendency. I have found that for some types of work, about 1% of iron avoids the difficulties resulting from "running." On other types of work, 2% to 4% may be needed. In more extreme cases, 6% may be needed, and as indicated above, if no running whatever is wanted, then 12% may be used. Accordingly it will be understood that the amount of iron may be proportioned in accordance with one's particular needs. I generally prefer to use at least 1% of iron in my pastes.

When as little as 0.5% of finely-divided iron is used, I have found that the strength of a brazed joint is increased appreciably over the strength obtained therein by using pure or commercial copper as the sole brazing metal. It is, of course, known that small amounts of iron may be dissolved in molten copper and that such alloyed copper is somewhat improved in tensile strength (Hanson and Ford, Jour. Inst. of Metals, vol. 32, pp. 335-62). Perhaps it is this effect that causes the noted increase in joint strength or perhaps the improved joint strength is due to the better filleting action of my brazing material, or to improved strength resulting from the mere mechanical aspects of the aggregate of finely-divided iron dispersed in solid brazing metal which my brazing material produces. I am not certain what the true explanation is, but it is clear from tests I have made that the joint strength is increased by having my indicated small amounts of finely-divided iron available at an intended joint along with molten copper.

I have also found that when suitable amounts of finely-divided iron within the range indicated above are used at intended joints, strong and sound joints may be made even though the parts of the assembly have a poor or loose fit. My invention accordingly makes it possible to salvage assemblies which heretofore would have been scrapped. The finely-divided iron appears to induce the molten copper to bridge a wider gap than ordinarily, thereby to braze loose-fitting parts together. A different action seems to be involved in the case of the "blinding" of brazed wire screening, however, since here the finely-divided iron prevents such blinding probably by reducing the "running" tendency.

My invention also makes it possible to reduce the amount of brazing metal per joint, especially in assemblies to which the brazing composition is applied by spraying, brushing or dipping. In some instances of this kind, savings in copper of up to one-half have been observed. The finely-divided iron appears to improve the effectiveness of the copper to such an extent that a sound joint can be made with appreciably less total copper.

The finely-divided iron may be made available at the intended joint in various ways. Thus the invention may be practiced by preparing brazing pastes which contain either metallic iron powder or reducible iron compounds or both in combination with metallic copper powder or reducible copper compounds or both. I especially prefer to use a paste which contains a mixture of copper oxides and iron oxides adapted to supply the desired proportions of copper and iron when reduced in the brazing furnace. The use of reducible oxides, salts or other compounds makes it readily possible to liberate the metallic components in a finely-divided condition. The iron particles should always be of a fineness below about 5 microns in diameter but the copper particles may be appreciably coarser, as for example, finer than about 20 mesh. Practically any liquid which at normal temperatures does not attack or corrode the metal assemblies may serve as a vehicle to form such mixtures into pastes. Water, alcohols, glycerine, glycols, mineral oil, petroleum jelly, greases, organic glues such as fish glue, organic adhesives, e. g., pyroxylin, etc., may be used, although some of such vehicles may be subject to one or more of the defects which I have described at length in my copending applications, supra, and to avoid such defects I prefer to prepare pastes in accordance with the principles set forth in those applications, using gel vehicles or carriers which leave little or substantially no residue on the finished work. Accordingly I may use natural or synthetic hydrocarbon gels of low Conradson residue or aqueous gels of organic materials having low Conradson residues, and I may include an oxidizing agent which is effective in scavenging some or all of the carbonaceous residues left on the work when such organic materials have been decomposed by the temperatures and atmospheres of the brazing furnace. I may also include fluxes which are effective in causing the finely-divided particles of copper to wet each other and to wet the ferrous or other metals of the joint which is to be brazed. Organic film-forming materials may also be included for the purposes mentioned in those applications. These aspects are all amply described in the said copending applications.

The following examples illustrate various embodiments of my invention.

Example 1

A brazing paste was prepared by mixing together 1 part of ferric oxide (analyzing about 70% iron) which had been pulverized to particles smaller than 3 microns diameter, 9 parts of copper powder in particles finer than 325 mesh, and 1 part of water. The paste was applied to assemblies of pressed steel parts and the assemblies were brazed in a conventional brazing furnace. The paste served to prepare strong, brazed joints which exhibited moderately heavy fillets in angle joints, and little "running" tendency on the part of the brazing metal.

Example 2

A brazing paste was prepared by thoroughly blending together 1 part of finely pulverized iron oxide (analyzing about 70% iron) having particle diameters finer than about 3 microns, 9 parts of copper powder having particle diameters smaller than 325 mesh, and 1 part of machine oil (SAE 30). The paste yielded strong, sound brazed joints on steel assemblies, and produced heavy fillets in angle joints.

Example 3

A brazing paste was prepared by thoroughly blending together 1 part of minus 3 micron reduced iron powder, 9 parts of minus 325 mesh copper powder, and 1 part of glycerin. When assemblies of steel parts were brazed with the paste, they exhibited very little running tendency on the part of the brazing metal.

Example 4

Five gallons of a hydrocarbon-gel brazing paste were prepared from the following ingredients:

| Ingredient | Amount |
|---|---|
| Cuprous oxide (minus 325 mesh) lbs | 107 |
| Synthetic polymeric hydrocarbon oil lbs | 7 |
| Synthetic polymeric hydrocarbon petrolatum lbs | 7 |
| Iron oxide (70% iron) (minus 3 micron) lbs | 5 |
| Boric acid oz | 9 |
| Borax oz | 9 |
| Potassium nitrate oz | 18 |
| Water oz | 56 |
| Petroleum sulfonate (wetting agent) oz | 2 |
| Anti-spattering agent oz | 2 |

The synthetic hydrocarbon oil is a product of commerce derived from petroleum, and has the following general properties:

| Property | Value |
|---|---|
| API gravity | 25°–30° |
| Flash F | 270°–300° |
| Fire F | 310°–340° |
| Viscosity (S. U.[1] at 100° F.) seconds | 55–65 |
| Conradson residue per cent | .01 |

[1] Saybolt Universal.

The synthetic hydrocarbon petrolatum is a product of commerce derived from petroleum, and has the following properties:

| Property | Value |
|---|---|
| API gravity | Approx. 33.0° |
| Flash (minimum) | Approx. 350° F. |
| Fire (minimum) | Approx. 400° F. |
| Viscosity (S. U.[1] at 210° F.) | Approx. 65 seconds. |
| Melting point | 115°–125° F. |
| Conradson residue | Approx. 0.19%. |

[1] Saybolt Universal.

The anti-spattering agent may be any of the many agents used for anti-spattering purposes in margarines and similar oil-water emulsions, although it does not here need to be of edible grade. The material known commercially as Emargol (a product of the Emulsol Corp., Chicago, Illinois) is an example of an anti-spattering agent suitable for use in the above formulation. It is composed essentially of sodium salts of sulfoacetate derivatives of mono- and di-glycerides. Such and related anti-spattering agents are described in U. S. Patent No. 1,917,255, issued July 11, 1933 to Benjamin R. Harris.

The foregoing ingredients are combined in the following manner to produce a paste which yields a brazing metal composed of about 4% iron, balance copper. The synthetic hydrocarbon oil and synthetic petrolatum are mixed together for approximately 30 minutes to ensure homogeneity, after which the iron oxide is added and mixed in by continued stirring for about 10 minutes. The boric acid, borax, potassium nitrate and wetting agent are dissolved in the water and the resulting solution is then stirred into the oil-iron oxide dispersion. The whole mass is mixed well for another 10 minutes, after which the anti-spattering agent and the cuprous oxide are stirred in. The mass is then well mixed for about 30 minutes and screened through a 325 mesh screen. The screened product is ready for use.

It will be understood that a thermally-depolymerizable, low Conradson-residue vehicle is employed here to minimize the deposition of carbon on the brazed work, and that potassium nitrate is included to act as a scavenger for the small amount of carbon which might otherwise be deposited. The principles on which the formulation is based, are set forth in my copending application Serial No. 107,139.

This paste is non-settling and may be applied to the work by ejecting it from an applicator, and produces substantially carbon-free, sound, brazed joints between the parts of the work when the latter are furnace brazed at about 2050° F. in an atmosphere of cracked ammonia, hydrogen, or mixtures of hydrogen and carbon monoxide.

Example 5

Five gallons of an aqua-gel type of brazing paste were prepared from the following ingredients:

| Ingredient | Amount |
|---|---|
| Ethylene glycol lbs | 10 |
| Water lbs | 10 |
| Sodium alginate lbs | 0.3 |
| Iron oxide (70% iron) (minus 3 micron) lbs | 19 |
| Cuprous oxide lbs | 108 |
| Petroleum sulfonate (wetting agent) oz | 4 |

The ethylene glycol, sodium alginate and water (which is hot) are mixed with fast agitation for about 2 hours, then the iron oxide is added and mixed for 15 minutes, then the cuprous oxide is added and the whole mass is mixed for 30-45 minutes, after which the wetting agent is added and mixed in by stirring for an additional 15 minutes. The paste is then screened through a 325 mesh sieve and after screening is ready for use. The resulting paste is non-settling and may be applied to the work by ejecting from a piston-type applicator. It yields a brazing metal composed of about 12% of iron and 88% of copper when it is reduced in brazing-furnace atmospheres and at brazing-furnace temperatures. The resulting brazing metal exhibits practically no running tendency and is used in special instances where such characteristic is desired. The paste is also useful as a master paste which can be blended with the pastes of Examples 6 and 7. When so blended with the paste of Example 6 in various proportions, a paste of any desired iron content between about 1% and 12% can be prepared. My above paste or any of the blended pastes may be thinned to desired consistency with water or ethylene glycol.

The paste of Example 5 is especially useful for spot or tack brazing, such as where two sheets of metal are held together in lapped position by a series of small brazed spots, analogous to spot-welded assemblies, or where a pair of abutting sheets are tacked together at a few points along the joint. The paste is also very useful in brazing laminated assemblies. The paste is first thinned to a dipping consistency with water or ethylene glycol, and then the assemblies or their individual parts are dipped into it. The non-running characteristic of the brazing metal derived from the paste makes it possible to use much less copper than would be needed if only plain copper were used. The paste may also be used for building up or restoring work areas of machine parts. In performing this type of work, however, it is best to reach the desired thickness by brazing successive layers applied a little at a time. A further use of this paste is in salvaging parts which already carry a quantity of copper. For example, by adding a paste containing 12% iron, the resulting brazing metal on the part will "run" less freely and the part can be satisfactorily brazed over again to salvage it. The paste may be thinned and may be sprayed or brushed on to particular areas of machine parts to deposit barrier coatings such as are used to prevent carburization of those particular areas.

*Example 6*

A paste was made from the following ingredients:

Ethylene glycol _____ lbs__ 10
Water _____ lbs__ 10
Sodium alginate _____ lb__ 0.3
Iron oxide _____ lbs__ 1.7
Cuprous oxide _____ lbs__ 110
Petroleum sulfonate _____ oz__ 4

The ingredients are combined in the manner described in Example 5. The paste produces a brazing metal composed of about 1% iron, balance copper, and is generally used in place of the usual copper supplied in the forms of rings, slugs, electroplate, etc., for production of stronger joints, to save copper, or where decreased "running" is wanted. This paste affords remarkable improvements in joint strength and where strength is the primary consideration it is the paste I prefer to use. Further additions to the iron content of this paste do not appreciably increase the strength characteristics except in those special cases where strength is increased by eliminating sharp corners in the joint. Higher iron contents make somewhat heavier fillets but this paste gives much better filleting than does plain copper.

It will be noted that the vehicle in this paste and in the paste of Example 5 is essentially a jellied ethylene glycol. The ethylene glycol decomposes in the brazing furnace into carbon monoxide and hydrogen, and hence is harmless to the atmospheres generally employed in furnace brazing operations. The wetting agent facilitates application of the pastes to oily parts. While no fluxes are included in these pastes and are seldom needed, when the need for them arises they may be incorporated. Small amounts of a mixture of boric acid and borax constitute a convenient flux.

*Example 7*

A paste was prepared from the following ingredients:

Ethylene glycol _____ lbs__ 10
Water _____ lbs__ 10
Sodium alginate _____ lb__ 0.3
Iron oxide (70% iron) (minus 3 micron) _____ lbs__ 5
Cuprous oxide _____ lbs__ 107
Petroleum sulfonate _____ oz__ 4

The ingredients are mixed in the manner described in Example 5.

This paste yields a brazing material composed of about 4% of iron and 96% of copper and is a useful general-purpose brazing paste. The brazing material exhibits very little "running" tendency and gives joints of improved strength. By employing this paste, the copper consumption per joint may be reduced as much as one-half while yet making joints which are as strong as, or stronger than, those made from plain copper. The paste is well suited for use in brazing assemblies having large joint clearances; that is, poor or loose fits.

It will be understood that the pastes of my invention can be used in brazing any of the metals or metalloid materials which have heretofore been brazed with copper, such as iron, steel, stainless steel, molybdenum, tungsten, cutting tool carbides and like metallic carbides. It will also be understood that they may be formulated with any suitable liquid carrier which is substantially free of corroding action on the metals of the pastes and the metals which are to be brazed, and may include such assisting agents as wetting agents, any of the known fluxing agents or fluxing mixtures, anti-spattering agents, viscosity modifiers, diluents, adhesives, organic film-forming materials such as are used in paints and lacquers, anti-freeze agents, thickening agents, etc. Preferably, however, they employ carriers which have gel characteristics, since these carriers overcome or mitigate the settling tendency of the iron- and copper-yielding components. It is also preferable to employ carriers which have a low Conradson residue and to include in the paste an oxidizing component which is effective in scavenging such carbon as tends to be deposited on the work by organic components of the paste. Suitable oxidizing agents are the alkali-metal nitrates, nitrites, and peroxides and the alkali-earth-metal nitrates and peroxides, these oxidizing agents having melting points above about 200°, and being capable of liberating oxygen by decomposition at higher temperatures. It will be understood, however, that this invention is a continuation-in-part of my copending applications dealing with the above mentioned preferences but is distinguished therefrom in being directed to the merits and advantages which stem from the use of pastes which yield iron-copper brazing metal having between about ½ and 12% of iron, balance substantially all copper.

It should also be understood that while it is known that small amounts of iron dissolved in copper increase the strength of copper, my brazing pastes yield brazed joints which are characterized by improvements other than the mere increase in strength resulting from iron dissolved in copper. Thus, the pastes yield finely-divided iron particles in admixture with copper particles in the area around an intended joint prior to the time at which the brazing metal becomes liquid. The presence of such iron particles controls the "running" characteristics of the liquid copper, assists it in bridging wider gaps than otherwise, improves the filleting action, and produces stronger joints by reason of the presence in the brazing metal and in the brazed joints of undissolved iron particles. While some of the iron particles derived from the paste may dissolve in the copper, thereby increasing the strength of the copper, the improved strength of joints made from my pastes is believed to be due at least in part to the undissolved iron particles which are dispersed through the brazing metal. Joints made with my pastes are characterized by containing such dispersed particles.

From what has now been described, it will be apparent that the invention may be embodied in a wide variety of paste formulations, the carrier of which may be selected and modified or not with a view to imparting to the paste those particular physical properties which best suit the particular requirements of the joints which are to be made.

In the foregoing description of the invention, I have mentioned Conradson residue values in various places. The Conradson test is described in the A. S. T. M. Standards, 1946, part III-a, at page 120, under the A. S. T. M. designation D189-46. The test is commonly applied to petroleum products to measure the extent to which such materials crack to carbon when heated under the conditions of the test. While most of the residue remaining in the test crucible upon completion of the test is carbon, it will be appreciated that the residue will also contain whatever non-volatile inorganic materials were present in the test sample. Accordingly, the test serves as a basis for the evaluation of materials as to the total quantity of non-volatile residue which the material will leave when heated under conditions simulating those of the Conradson test.

Having now described the invention, what I claim is:

1. A composition of matter particularly adapted for use as a brazing paste in furnace-brazing and like operations, said composition comprising the following essential components: a major quantity of cupreous material selected from the group consisting of copper powder and powdered compounds of copper reducible to copper powder; a minor quantity of ferruginous material selected from the class consisting of iron powder and powdered compounds of iron reducible to iron powder, the total available metallic iron content of said ferruginous material amounting to between about 0.5% and 12% of the total available metallic copper content of said cupreous material, and the particle size of said ferruginous material being below about 5 microns; and a minor quantity of a non-corrosive, non-metallic, thermally-evanescent plasticity-imparting carrier component intimately mixed with said cupreous and ferruginous materials and making a paste therewith, said composition of matter being characterized by yielding molten brazing copper having less tendency to run on the work than does molten brazing copper derived from the composition when the ferruginous material thereof is omitted.

2. A composition as claimed in claim 1 wherein the cupreous material is composed of copper oxides, and wherein the ferruginous material is composed of iron oxides proportioned to yield between about 1% and 12% of iron by weight of the available copper in the copper oxides.

3. A composition as claimed in claim 2 which includes a small amount of fluxing material.

4. A composition as claimed in claim 2 which includes a small amount of organic film-forming material.

5. A composition of matter particularly adapted for use as a brazing paste in furnace-brazing and like operations, said composition comprising essentially: a major quantity of cupreous material selected from the group consisting of copper powder and powdered compounds of copper reducible to copper powder; a minor quantity of ferruginous material selected from the class consisting of iron powder and powdered compounds of iron reducible to iron powder, the total available metallic iron content of said ferruginous material amounting to between about 0.5% and 12% of the total available metallic copper content of said cupreous material, and the particle size of said ferruginous material being less than about 5 microns; and a minor quantity of a thermally-evanescent plasticity-imparting gelled carrier component intimately mixed with said cupreous and ferruginous materials and making a paste therewith, said carrier component giving a Conradson residue below about .5% and being composed essentially of a liquid component and an organic gel-forming material, said composition being characterized by yielding molten brazing copper having less tendency to run on the work than does molten brazing copper derived from the composition when the ferruginous material thereof is omitted.

6. A composition as claimed in claim 5 wherein the total metallic iron content is between about 1% and 12% and wherein the liquid component of said carrier is an organic liquid.

7. A composition as claimed in claim 5 wherein the liquid component of said carrier is a synthetic heat-depolymerizable hydrocarbon polymer, and wherein the organic gel-forming material is a synthetic heat-depolymerizable hydrocarbon gel.

8. A composition as claimed in claim 7 wherein the total available metallic iron content of said ferruginous material is between about 1% and 12% of the total available metallic copper content of said cupreous material.

9. A composition as claimed in claim 5 wherein the liquid component of said carrier is composed of water and ethylene glycol.

10. A composition as claimed in claim 9 wherein the organic gel-forming material is alkali-metal alginate.

11. A composition as claimed in claim 10 wherein the total available iron content of said ferruginous material is between about 1% and 12% of the total available copper content of said cupreous materials.

12. A composition of matter particularly adapted for use as a brazing paste in furnace-brazing and like operations, said composition comprising essentially: a major quantity of cupreous material selected from the group consisting of copper powder and powdered compounds of copper reducible to copper powder; a minor quantity of ferruginous material selected from the class consisting of iron powder and powdered compounds of iron reducible to iron powder, the total available metallic iron content of said ferruginous material amounting to between about 0.5% and 12% of the total available metallic copper content of said cupreous material, and the particle size of said ferruginous material being less than about 5 microns; a minor quantity of a thermally-evanescent plasticity-imparting gelled carrier component intimately mixed with said cupreous and ferruginous materials and making a paste therewith, said carrier component giving a Conradson residue below about .5% and being composed of a liquid component and an organic gel-forming material; and a small amount of an inorganic oxidizing agent having a melting point above about 200° C. and capable of liberating oxygen by decomposition at higher temperatures, the amount of said oxidizing agent being sufficient to oxidize substantially all of the carbon contained in the Conradson residue of said carrier component to at least one gaseous carbon-oxygen compound, said composition being characterized by yielding molten brazing copper having less tendency to run on the work than does molten brazing copper derived from the composition when the ferruginous material thereof is omitted.

13. A composition as claimed in claim 12 wherein the liquid component of said carrier is an organic liquid.

14. A composition as claimed in claim 12 wherein the liquid component of said carrier is a synthetic heat-depolymerizable hydrocarbon polymer, and wherein the organic gel-forming material of said carrier is a synthetic heat-depolymerizable hydrocarbon gel.

15. A composition as claimed in claim 14 wherein the total available iron content of said ferruginous material is between about 1% and 12% of the total available metallic copper content of said cupreous material.

16. A composition as claimed in claim 15 which includes a small amount of fluxing materials.

17. A composition as claimed in claim 15 which includes a small amount of liquid organic film-forming material.

LOUIS G. KLINKER.

REFERENCES CITED

The following references are of record in the file of this patent:

UNITED STATES PATENTS

| Number | Name | Date |
|---|---|---|
| 780,128 | Reynolds | Jan. 17, 1905 |
| 804,664 | Leisel | Nov. 14, 1905 |
| 829,155 | Hopper | Aug. 21, 1906 |
| 1,793,157 | Chapin | Feb. 17, 1931 |
| 1,927,626 | Calkins | Sept. 19, 1933 |
| 2,060,959 | Terry | Nov. 17, 1936 |
| 2,401,221 | Bourne | May 28, 1946 |

FOREIGN PATENTS

| Number | Country | Date |
|---|---|---|
| 8,466 | Great Britain | June 25, 1903 |